(12) United States Patent
Nonaka

(10) Patent No.: US 7,791,669 B2
(45) Date of Patent: Sep. 7, 2010

(54) PICTURE TAKING APPARATUS HAVING FOCUSING DEVICE

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 483 days.

(21) Appl. No.: 11/656,753

(22) Filed: Jan. 23, 2007

(65) Prior Publication Data
US 2007/0115385 A1 May 24, 2007

Related U.S. Application Data

(62) Division of application No. 10/364,444, filed on Feb. 11, 2003, now abandoned.

(30) Foreign Application Priority Data

Feb. 19, 2002 (JP) ............................ 2002-041823

(51) Int. Cl.
- H04N 5/232 (2006.01)
- H04N 5/222 (2006.01)
- G03B 3/10 (2006.01)

(52) U.S. Cl. .................. 348/349; 348/346; 348/333.02; 396/121

(58) Field of Classification Search .................. 348/345, 348/346, 349, 353, 333.02, 333.03; 382/118; 396/121, 123

See application file for complete search history.

(56) References Cited

U.S. PATENT DOCUMENTS

| 5,128,705 A * | 7/1992 | Someya et al. .............. 396/123 |
| 6,249,317 B1 * | 6/2001 | Hashimoto et al. .......... 348/349 |
| 6,584,284 B1 * | 6/2003 | Odaka ........................ 396/121 |
| 2001/0022626 A1 * | 9/2001 | Nozaki ....................... 348/345 |
| 2002/0008765 A1 * | 1/2002 | Ejima et al. ................. 348/239 |
| 2003/0071908 A1 * | 4/2003 | Sannoh et al. .............. 348/345 |

FOREIGN PATENT DOCUMENTS

| JP | 61-123368 | 6/1986 |
| JP | 09-159906 | 6/1997 |

OTHER PUBLICATIONS

Notification of Reasons for Refusal for Japanese Patent Application No. 2002-041823, dated Mar. 6, 2007 (4 pgs.) with translation (6 pgs.).

* cited by examiner

*Primary Examiner*—Nhan T Tran
(74) *Attorney, Agent, or Firm*—Straub & Pokotylo; John C. Pokotylo

(57) ABSTRACT

A plurality of distance measuring points in a picture can be correctly and rapidly focused on. Images at a plurality of distance measuring points in the picture can be detected through a photographing lens by means of an image pickup element. These detected distance measuring points can be displayed on a monitor screen. Finally, a photographing lens can be controlled with respect to the displayed distance measuring points so as to cause the output from the image pickup element to reach its highest contrast.

4 Claims, 11 Drawing Sheets

US 7,791,669 B2

PICTURE TAKING APPARATUS HAVING FOCUSING DEVICE

CROSS-REFERENCE TO RELATED APPLICATION

This application is a divisional of U.S. patent application Ser. No. 10/364,444, filed on Feb. 11, 2003 now abandoned, which claims the benefit of Japanese Patent Application No. 2002-41,823, filed on Feb. 19, 2002, in Japan. The contents of each of these applications are incorporated by reference.

BACKGROUND OF THE INVENTION

1. Field of the Invention

This invention relates to a picture taking apparatus, such as cameras, having a focusing device, and more particularly, to digital cameras.

2. Description of the Related Art

A digital camera has image pickup means for electrically detecting an image of a subject through a photographing lens. It is widely known that digital cameras perform focusing using an image signal outputted from the image pickup means. This auto focus technology finely adjusts the focus of the photographing lens to find a lens position where the contrast of an image becomes highest. Accordingly, with digital cameras, time to move the photographing lens is needed and this so-called release time lag may become long. This type of focusing technology in which the photographing lens is controlled to move it toward a position where the contrast of an image becomes highest is called a hill-climbing auto-focusing method.

Numerous auto-focusing (AF) methods for correctly focusing a subject regardless of its location in a picture have been proposed recently. These methods are known as a multi-focus system. Displaying a focusing result in a viewfinder is described in, for example, Laid-Open Japanese Patent Application No. Hei 10-48,733.

Hei 10-48,733 discloses a camera capable of selecting, automatically or by a manual manipulation of a photographer, any of three distance measuring points provided in a picture for photography and focusing a subject existing at the selected distance measuring point. However, the control sequence of this camera is set so that if a previously selected distance measuring point needs to be changed, the control sequence returns to a distance measuring point selecting step after the previously selected distance measuring point has already been focused. Consequently, repeating focusing takes time and delays photography. This delay may become unacceptable particularly if the hill-climbing auto-focusing method is used.

SUMMARY OF THE INVENTION

According to one aspect of this invention, a picture taking apparatus capable of focusing on one of a plurality of distance measuring points in a picture for photography, comprising: a focus detecting device capable of obtaining distance information of each of the plurality of distance measuring points; a control section for controlling a photographing operation of the apparatus to select one distance measuring point from the plurality of distance measuring points by using the distance information obtained by the focus detecting device and to display the selected distance measuring point on a display member; and a focusing device capable of focusing a subject lying at the selected distance measuring point to maximize the contrast of an image of the subject.

According to another aspect of this invention, a focusing method for use with a picture taking apparatus capable of focusing on one of a plurality of distance measuring points in a picture for photography, comprising: selecting one distance measuring point from the plurality of distance measuring points by using an image signal of a subject or distance information on the subject; displaying an indicator of the selected distance measuring point in such a manner as to superimpose the indicator on a subject image; accepting an input change signal for changing the distance measuring point; changing the displayed distance measuring point to another distance measuring point in response to the change signal; and focusing a subject lying at the other distance measuring point to maximize the contrast of an image of the subject, wherein the steps of accepting an input change signal and changing the displayed distance measuring point are performed before any focusing on the initially selected distance measuring point.

According to still another aspect of this invention, a focusing method comprising: determining a main subject in picture for photography; setting a position of the main subject as a distance measuring point; displaying the set distance measuring point; determining whether the distance measuring point set is to be changed; and executing a hill-climbing auto-focusing operation, if it is determined that the distance measuring point set is not to be changed, on the distance measuring point set, and, if it is determined that the distance measuring point is to be changed, on the distance measuring point changed on the basis of a determined result.

According to still another aspect of this invention, an auto-focusing device comprising: means for detecting images at a plurality of points in a picture; means for selecting one distance measuring point from the plurality of distance measuring points based on a result detected by the means for detecting, and for displaying an indicator associated with the selected distance measuring point; and means for controlling a photographing lens to a subject corresponding to the distance measuring point displayed so as to cause an output from the means for detecting to reach its highest contrast.

According to still another aspect of this invention, a picture taking apparatus comprising: an image pickup section for detecting an image signal of a subject; and a display section for displaying an image of the subject, the display section having a first display mode for a subject image detected by the image pickup section and an indicator of a position of a target to be focused, and a second display mode for displaying a magnified image of the target to be focused.

Other features and advantages will be explained in detail in the following examples.

BRIEF DESCRIPTION OF THE DRAWINGS

This invention will become more fully understood from the detailed description given below and the accompanying drawings, which are given by way of illustration only and thus are not limitative of this invention, wherein.

DETAILED EXPLANATION

A first example will be described below with reference to FIGS. 1 to 5.

Figure 1:
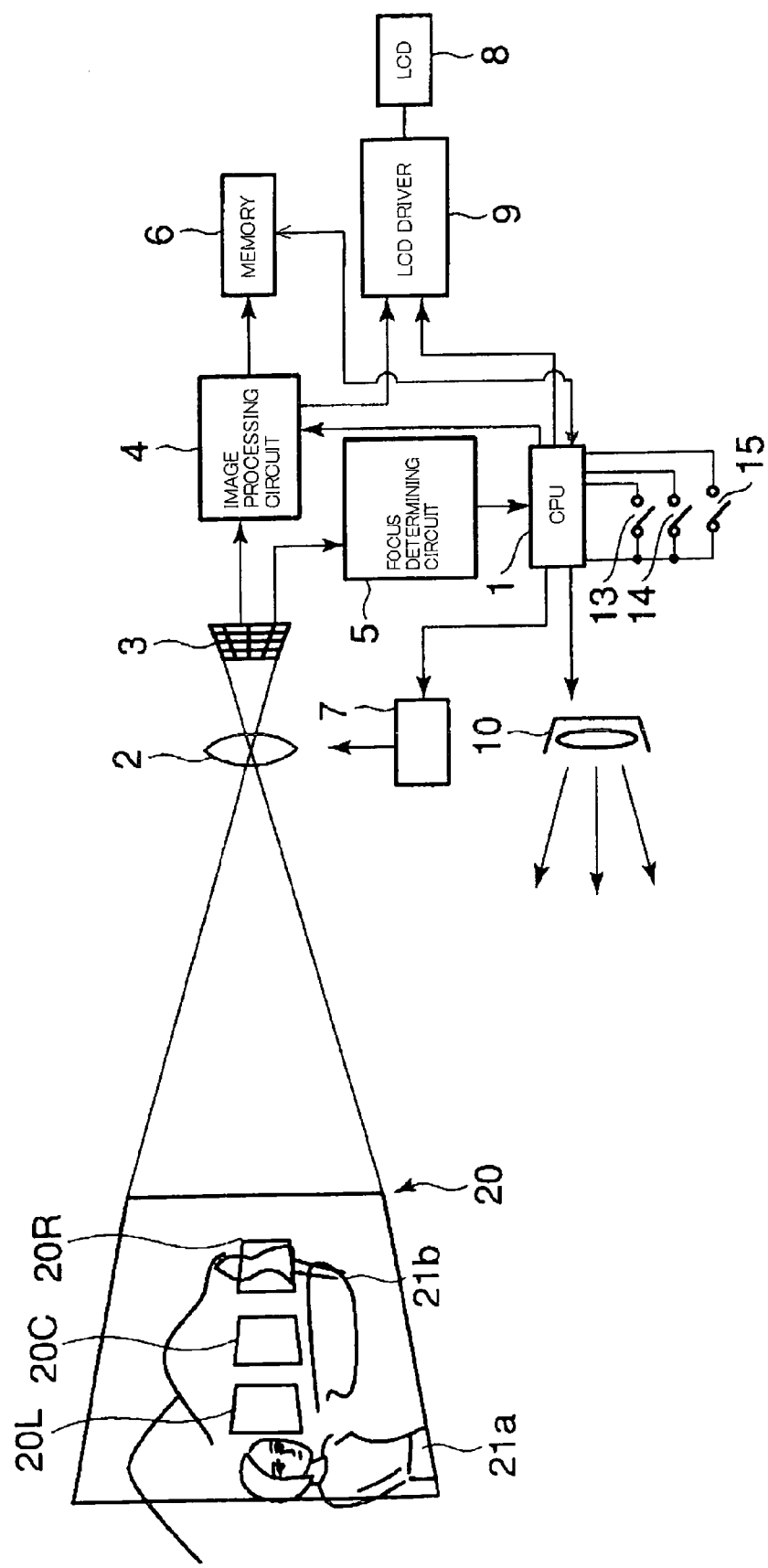
FIG. 1 is a block diagram showing the components of a camera according to a first example.
Figure 2:
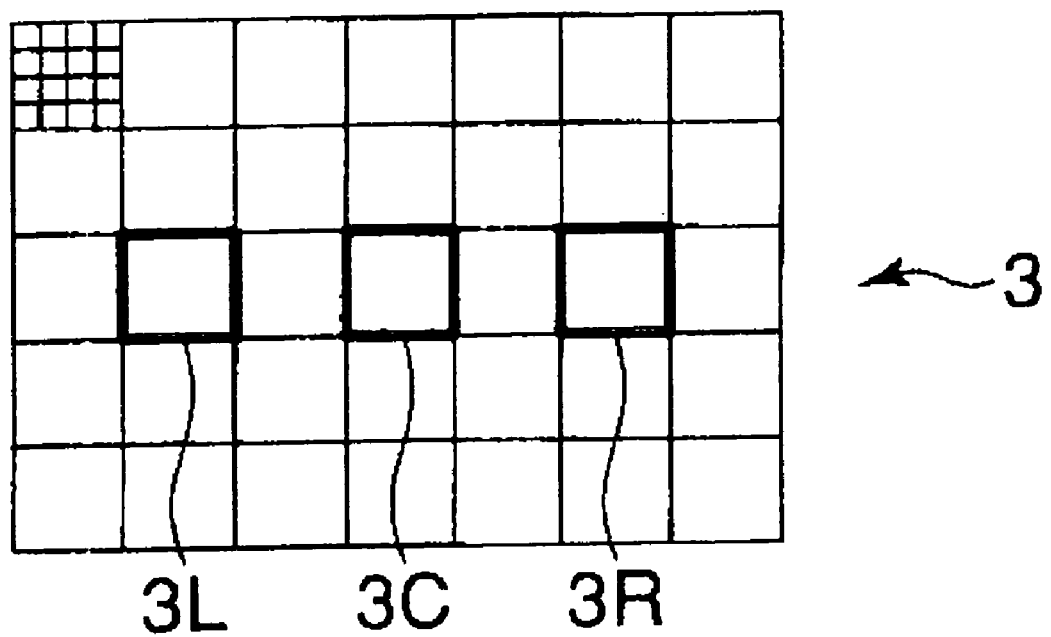
FIG. 2 is a view showing spot areas 3L, 3C and 3R of an image pickup element 3 which respectively correspond to selected points 20L, 20C and 20R in the picture area 20 shown in FIG. 1.

FIG. 1 is a block diagram showing components of a camera according to a first example.

Referring to FIG. 1, a CPU 1 is an arithmetic and control section composed of a one-chip microcomputer and the like. Connected to this CPU 1 are a photographing lens driver (LD) 7 for driving a photographing lens 2, an image processing unit (e.g., circuit) 4 and a focus determining unit (e.g., circuit) 5, an image pickup element 3 which receives a photographing light beam entering through the photographing lens 2, a memory 6 which is a storage section, an LCD driver 9 for driving an LCD 8 which is an image display section, and an electronic flash 10. The image processing circuit 4 and the focus determining circuit 5 are each supplied with the output from the image pickup element 3. Incidentally, the image pickup element 3 may use, for example, an area sensor.

A release switch (button) 13, a mode changing switch (button) 14 and a check switch 15 are also connected to the CPU 1. The release switch (button) 13 is comprised of a first release switch (1RSW) and a second release switch (2RSW).

In the camera having this construction, a photographing light beam from a scene (or a picture area) 20 to be photographed is received by the image pickup element 3 through the photographing lens 2. Incidentally, distance measuring points 20L, 20C and 20R in the picture area 20 correspond to areas 3L, 3C and 3R of the image pickup element 3 in FIG. 2, respectively.

The photographing light beam received by the image pickup element 3 is converted into an image signal in the image pickup element 3, and the image signal is output to the image processing circuit 4 and to the focus determining circuit 5. The image data of the image signal processed by the image processing circuit 4 is stored in the memory 6. At the same time, the corresponding image is displayed on the LCD 8 through the LCD driver 9 under the control of the CPU 1. In addition, the operating sequence of the entire camera is controlled by the CPU 1 on the basis of a stored program in accordance with the manipulation of the release switch 13 and/or the mode changing switch 14. The focusing control is performed by the focus determining circuit 5 on the basis of the output of the image pickup element 3. Namely, by extracting a predetermined spatial frequency component from the image signal, the contrast of the image is evaluated by the focus determining circuit 5. Based on the result of this evaluation, the photographing lens 2 is controlled through the photographing lens driver 7 by the CPU 1, whereby focusing is effected.

Incidentally, when a user activates a focus state confirming function which is provided for checking the focus state of the photographing lens to the image, an image signal corresponding to only a particular portion of the image pickup element 3 is selected through the image processing circuit 4. Then, the LCD driver 9 is controlled, and an image of the selected portion is displayed on the LCD 8 at a magnified scale, whereby the user can easily recognize the focus state of the image of the selected portion.

Furthermore, if exposure is insufficient during photography, the electronic flash 10 emits a flash of light under the control of the CPU 1, thereby compensating for low light.

FIGS. 3A to 3F are views for explaining how to manipulate the camera if, within the scene 20 to be photographed, the proportion occupied by a person 21a (a main subject) is small, the greater part of the picture is occupied by a landscape situated at a longer distance than the person 21a, and various subjects such as a tree 21b and a mountain exist together in the landscape. In a scene of this kind, subjects of lower spatial frequencies and subjects of higher spatial frequencies may exist together.

Figure 3A:
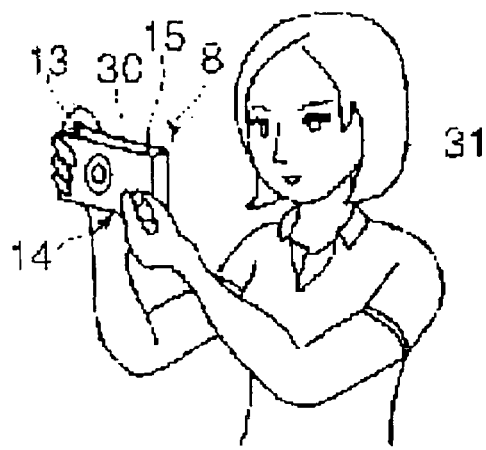
FIG. 3A is a view showing a user holding the camera.

Referring to FIG. 3A, the screen of the LCD 8 is provided on the back of a camera 30. The LCD 8 is controlled by the CPU 1 so that the displayed image on the LCD 8 can be switched in accordance with the manipulation of the release switch 13, the mode changing switch 14, or the like. A user 31, while viewing the screen of the LCD 8, can confirm whether a subject to be photographed and the state of focusing on the subject agree with the photographic intention of the user 31.

Figure 3B:
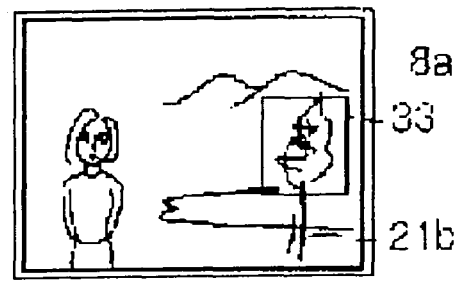
FIG. 3B is a view showing an image displayed on the monitor screen of the camera when a tree in a picture is selected as a distance measurement target.

First, when the user 31 depresses the release switch 13 partway (e.g., halfway) to close the first release switch (1RSW), the multi-focus function of the camera is activated and, as shown in FIG. 3B, a selection mark 33 indicative of a position selected as a distance measuring point in the photographing screen is displayed in a picture 8a. At this time, the multi-focus function of the camera may select a subject other than the subject intended as the main subject by the user 31. For example, in FIG. 3B, although a tree 21b is marked with the selection mark 33, the tree 21b is a subject different from the person 21a that the user 31 desires to photograph.

Figure 3C:
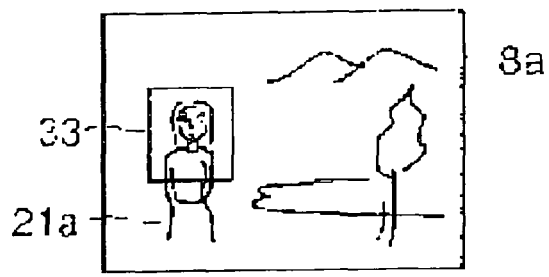
FIG. 3C is a view showing an image displayed on the monitor screen of the camera when a person in the picture is selected as a distance measurement target.

In this example, the camera is constructed so that the user 31 can move the selection mark 33 indicative of the distance measuring point as shown in FIG. 3C by the manipulation of the mode changing switch 14. A hill-climbing auto-focusing operation is started after the selection mark 33 has been moved.

Figure 3D:
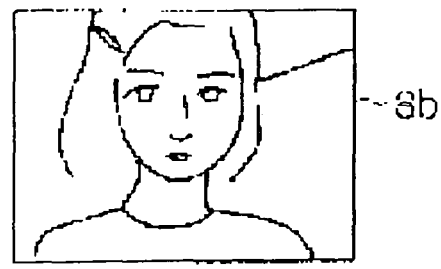
FIG. 3D is a view showing the state in which the distance measurement target selected in FIG. 3C is displayed at a magnified scale on the monitor screen.
Figure 3E:
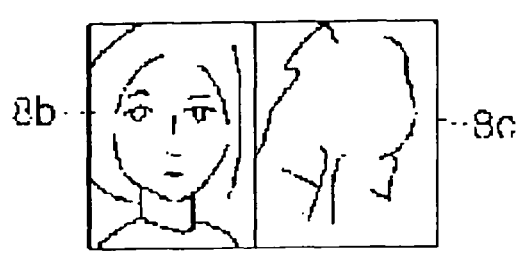
FIG. 3E is a view showing the state in which the distance measurement targets selected in FIGS. 3B and 3C are displayed side by side at a magnified scale on the monitor screen.

The manner of picture display may be such that, as shown in FIG. 3D, a portion corresponding to the portion marked with the selection mark 33 is displayed as a picture 8b at a magnified scale, automatically or in response to a manipulation performed by the user 31, after the hill-climbing auto-focusing operation. Alternatively, the manner of picture display may be such that, as shown in FIG. 3E, the portion previously selected by the camera and the portion corresponding to the selection mark 33 are displayed side by side at a magnified scale. In either case, the user 31 can recognize the state of focusing on the main subject, by means of an image displayed at a magnified scale.

Figure 3F:
FIG. 3F is a view showing the state in which the distance measurement target selected in FIG. 3B is displayed at a magnified scale on the monitor screen.

In addition, the manner of picture display may also be such that, when the state of the release switch 13 is maintained for a predetermined time period or more while the picture 8a is as shown in the FIG. 3B, a subject which is not intended to be the main subject by the user 31 is displayed at a magnified scale like the picture 8c shown in FIG. 3F. This is effective to help the user to avoid photography errors caused by focusing on an unintended main subject.

Figure 4:
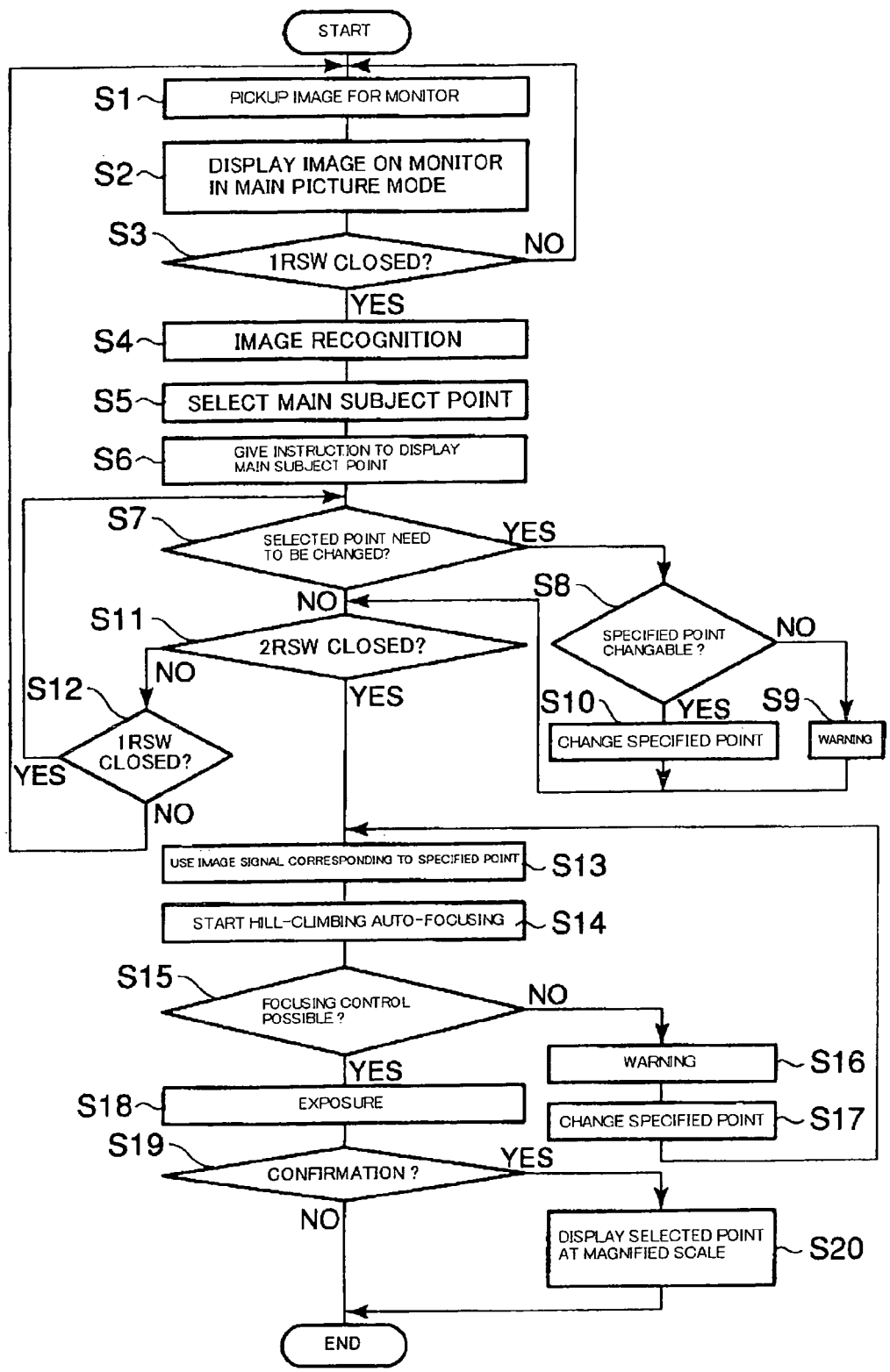
FIG. 4 is a flowchart of an exemplary photographing operation of the camera according to the first example.

FIG. 4 is a flowchart of a photographing operation of the camera controlled by the CPU 1. The photographing operation of the camera according to the first example will be described with reference to FIG. 4.

First, in Step S1, an image is picked up for the purpose of displaying an image on a monitor such as a viewfinder or the LCD 8. Normally, this step is started when a main switch (not shown) is turned on, but since the step is well known, the explanation thereof is omitted. In Step S2, the image picked up in Step 1 is displayed on the monitor (the LCD 8 or the viewfinder).

Then, in Step 3, it is determined whether the first release switch (1RSW) has been closed. The first release switch (1RSW) is closed when a user depresses partway (e.g., halfway) the release switch 13. If the first release switch (1RSW) is not closed, the process returns to the above-described Step S1, whereas if the first release switch (1RSW) is closed, the process proceeds to Step S4.

In Step S4, an image recognition such as a color recognition or a pattern recognition of a subject present in each area is performed by using the image signal obtained in Step 1. On the basis of the result of this image recognition, a subject suitable as a main subject is selected in Step S5. In the following Step S6, an instruction is given to the image display section so that a selection mark is displayed on the monitor in association with the selected subject.

Figure 5A:
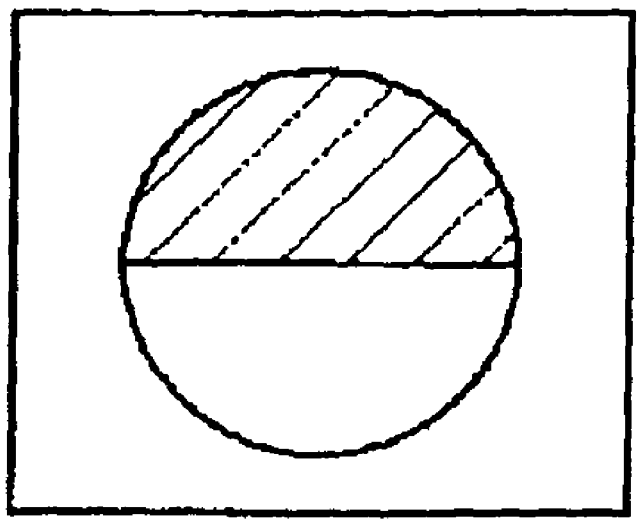
FIGS. 5A and 5B are views respectively showing examples of a pattern to be used for image confirmation in Step S4 of the flowchart of FIG. 4.
Figure 5B:
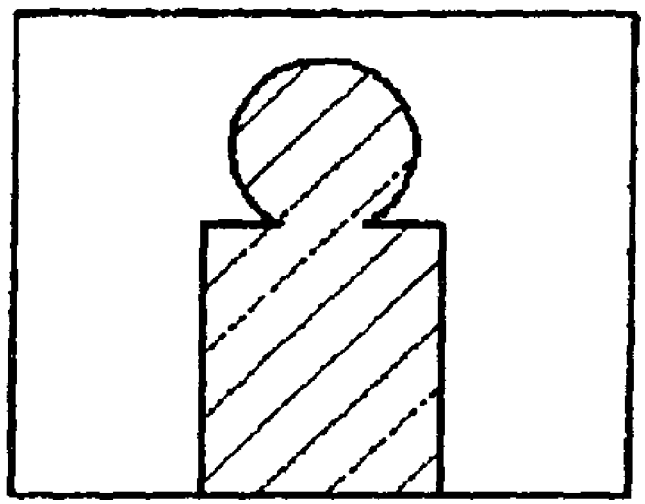

An example which can be adopted as a method for pattern (image) recognition in Step S4 is a method of preferentially selecting the head of a person in the scene by comparing the image and the circular shape shown in FIG. 5A through a pattern matching method. Another example is a method of preferentially selecting the upper part of the body of a person by comparing the image and the shape shown in FIG. 5B, a combination of a circle and a rectangle, through a pattern matching method. Alternatively, or in addition, it is also possible to adopt a method of determining the colors of an image and eliminating a subject of particular color, such as sky or ground, from targets to be selected, so that a subject unlikely to be the main subject intended by the user is not selected as a main subject.

Then, in Step S7, it is determined whether a distance measuring point (position) needs to be changed. When the user sees a selection mark disposed in the viewfinder, if the user does not want the subject associated with selection mark to be the main subject, the user can change the distance measuring point by manipulating the mode changing switch 14. If the distance measuring point is to be changed, the process proceeds to Step S8, whereas if the distance measuring point is not to be changed, the process proceeds to Step S11.

In Step S8, it is determined whether the distance measuring point can be changed. The reason for this is that there is a case where even if the distance measuring point should be changed (for example, due to the user manipulating mode changing switch 14), the distance measuring point cannot be changed. Such a case easily occurs when, for example, a subject having no contrast, or a constantly varying subject such as the waves of the sea, is selected as a distance measuring point to which the current distance measuring point is to be changed. If the distance measuring point cannot be changed, the process proceeds to Step S9 and a warning is issued. On the other hand, if the distance measuring point can be changed, the process proceeds to Step S10 and the position of the selection mark on the monitor is changed to correspond to a next subject or to a newly selected subject. After either of Steps S9 and S10, the process proceeds to Step S11, because it can be assumed that the user is satisfied with the position of the distance measuring point.

In Step S11, the state of the second release switch (2RSW), which is closed by the further (e.g., full) depression of the release switch 13, is detected. If the second release switch (2RSW) is not closed, the process proceeds to Step S12, in which a detection is again made as to the state of the first release switch (1RSW). If the first release switch (1RSW) is not closed in Step S12, the process returns to Step S1, whereas if the first release switch (1RSW) is closed in Step S12, the process proceeds to Step S7.

Referring once again to Step S11, on the other hand, if the second release switch (2RSW) is closed, the process proceeds to Step S13. In Step S13, setting for using an image signal corresponding to the position of the selection mark indicative of the distance measuring point on the monitor is applied to the image pickup element 3. Then, in Step S14, an auto-focusing operation, such as a hill-climbing auto-focusing operation, is started by using the selected image signal.

After that, in Step S15, it is determined whether focusing control is possible. If the subject cannot be focused at the selected distance measuring point, the process proceeds to Step S16 and a warning is issued. After that, in Step S17, the distance measuring point is changed on the monitor. Then, the process proceeds to Step S13.

In the case where a great importance is placed on reducing missing the shutter chance (i.e., the chance to capture the image), the decision of Step S15 may be omitted so that the process proceeds to the exposure operation of Step S18 after the (e.g., hill-climbing) auto-focusing operation of Step S14.

If focusing control is possible in Step S15, the process proceeds to the exposure control of Step S18. Then, in Step S19, it is determined whether the check switch 15 has been manipulated. If the check switch 15 has been manipulated, the process proceeds to Step S20, in which the selected distance measuring point is displayed at a magnified scale.

In the above-described example of the flowchart of FIG. 4, the process of displaying a distance measuring point at a magnified scale is performed after exposure control. However, it is also preferable to adopt a program in which the process of displaying a distance measuring point at a magnified scale is performed immediately after the focusing of Step S15 so that the user can confirm the position of a distance measuring point and the expression of a subject by means of an enlarged image before exposure.

As described above, in the first example, before the initiation of a time-consuming, (e.g., hill-climbing) auto-focusing operation, the position of a target to be focused is clearly displayed so that the user can determine whether the position of the target is appropriate. Accordingly, a time before shutter release can be reduced. In addition, a distance measuring point is displayed at a magnified scale after focusing so that the state of focusing is clearly displayed, whereby the user can accurately check the state of focusing.

A second example of the invention will be described below with reference to FIGS. 6 to 10.

The second example uses in combination both focusing using an image pickup element as in the first example and a so-called passive triangular distance measuring system which performs distance measurement by using a positional difference x based on the parallax between image signals obtained at sensor arrays through two light receiving lenses.

Figure 6:
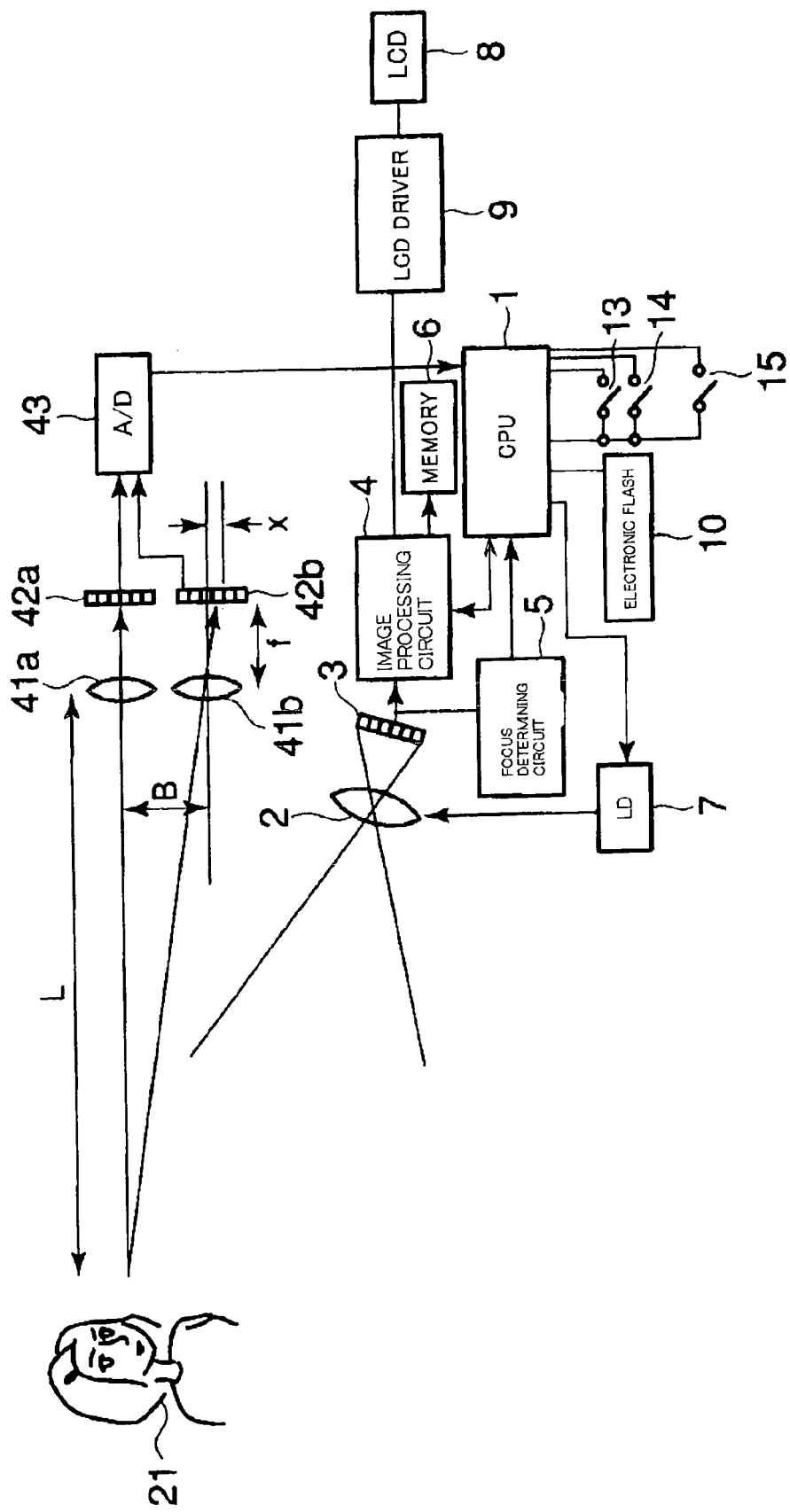
FIG. 6 is a block diagram showing components of a camera according to a second example of the invention.

FIG. 6 is a block diagram showing components of a camera according to the second example of the invention. In FIG. 6, the same reference numerals are used to denote the same parts as those of the first example, and the explanation of the same parts is omitted.

Referring to FIG. 6, photographing light beams coming from a subject 21 are respectively received by sensor arrays 42a and 42b through two light receiving lenses 41a and 41b. The data of the image signals obtained at the sensor arrays 42a and 42b are converted into digital signals by an A/D conversion section 43, and the digital signals are supplied to the CPU 1.

The CPU 1 compares these two digital image data, finds the positional difference x between two images, and calculates a subject distance L from the relationship of $L=B \cdot f/x$, where B is the distance between the principal points of the light receiving lenses 41a and 41b and $f$ is the distance between each of the light receiving lenses 41a and 41b and the corresponding one of the sensor arrays 42a and 42b.

The photographing lens 2 is focused on the position of the subject 21 lying at the distance L obtained by the above-described distance measuring device, by the CPU 1 through the photographing lens driver 7. During photography of a dark scene, the amount of light to be emitted from the electronic flash 10 is controlled on the basis of the brightness of the photographing lens 2 and the brightness (sensitivity) of the image pickup element 3. Control and functions such as the function of the release switch 13 and the display control of the LCD 8 are similar to those described above in connection with the first example.

Figure 7:
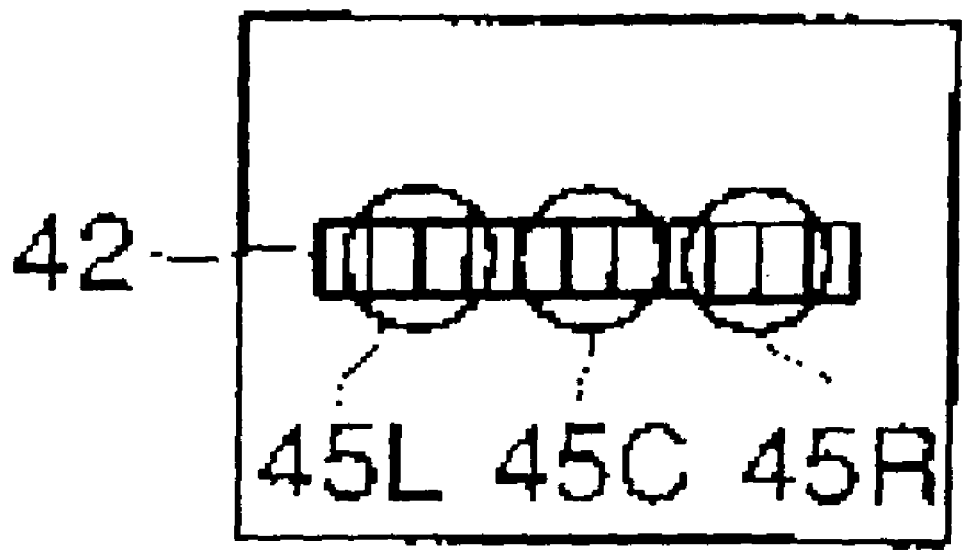
FIG. 7 is a view showing one of the distance measuring sensor arrays shown in FIG. 6, as well as the positions of three sensor arrays selectable as distance measuring points.

FIG. 7 shows a area which is monitored within the picture 20 by the above-described triangular distance measuring sensor arrays. For convenience of illustration, FIG. 7 shows a sensor array 42 in place of each of the sensor arrays 42a and 42b shown in FIG. 6. Namely, sensor arrays each identical to the sensor array 42 are respectively disposed behind the light receiving lenses 41a and 41b as the sensor arrays 42a and 42b.

Distance measurement at three points in the picture 20 can be performed by using the areas 45L, 45C and 45R of the sensor array 42. According to the manner of division of areas of the sensor array 42, it is possible to realize distance measurement not only at three points but also at five or seven points or more points.

Figure 8:
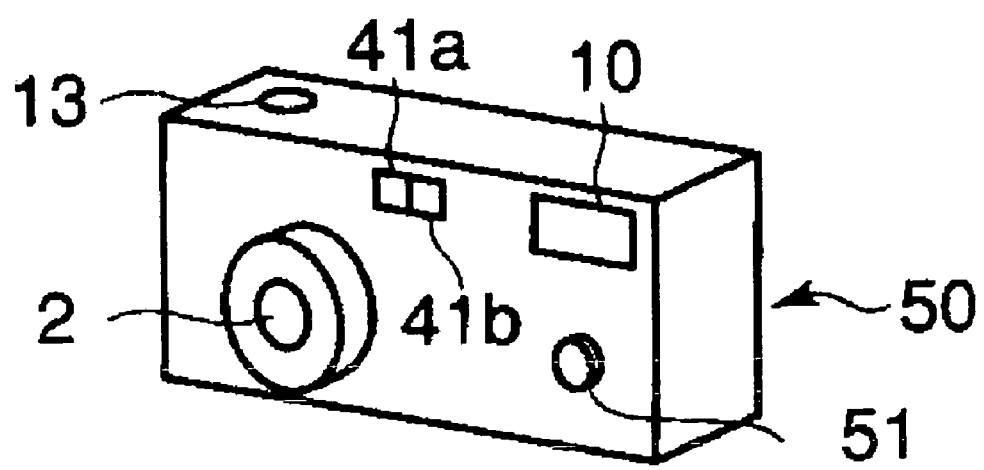
FIG. 8 is a perspective view of the external appearance of a camera according to a second example.

FIG. 8 is a perspective view of the external appearance of the camera according to the second example. As shown in FIG. 8, the photographing lens 2 is provided approximately in the center of the front portion of the body of a camera 50. The light receiving lenses 41a and 41b are disposed above the photographing lens 2. In addition, the electronic flash 10 and a combined switch 51 or the like comprised of the mode changing switch 14 and the check switch 15 are disposed on the front portion of the body of the camera 50 as shown in FIG. 8. Furthermore, the release switch 13 is provided on the top portion of the body of the camera 50.

Figure 9:
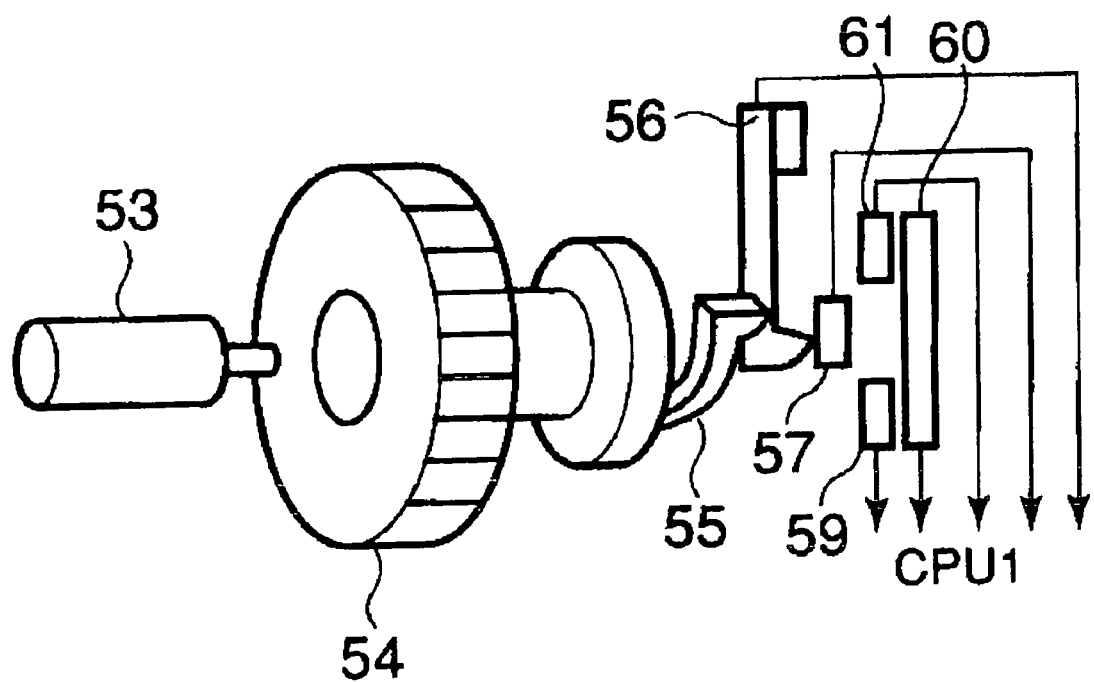
FIG. 9 is a view showing the construction of a combined switch 51 of the cameras of FIGS. 1 and 6.

FIG. 9 is a view showing an exemplary construction of the combined switch 51. The combined switch 51 is composed of a push switch section 53 and a dial switch section 54, and the push switch section 53 is inserted through the middle of the dial switch section 54. When the push switch section 53 is pressed, a metal 56 provided at one end of the dial switch section 54 is pressed into electrical contact with an electrode 57. As will be described later, the CPU 1 determines whether the check switch 15 has been turned on.

In addition, a metal 55 is interlocked with the rotation of the dial switch section 54 to bring an electrode 59 and an electrode 60 or the electrode 60 and an electrode 61 into electrical contact with each other. According to which of the electrodes 59 and 61 has been brought into electrical contact with the electrode 60, the CPU 1 determines the direction in which the user has rotated the dial switch section 54, and performs fine adjustment of focus according to the determined result.

In the second example as well, the release switch 13 is constructed to operate in two steps. In the first step, the first release switch (1RSW) is closed and check-purpose display control is performed. In the second step, the second release switch (2RSW) is closed (e.g., the release switch 13 is fully closed) and photography is performed.

Figure 10:
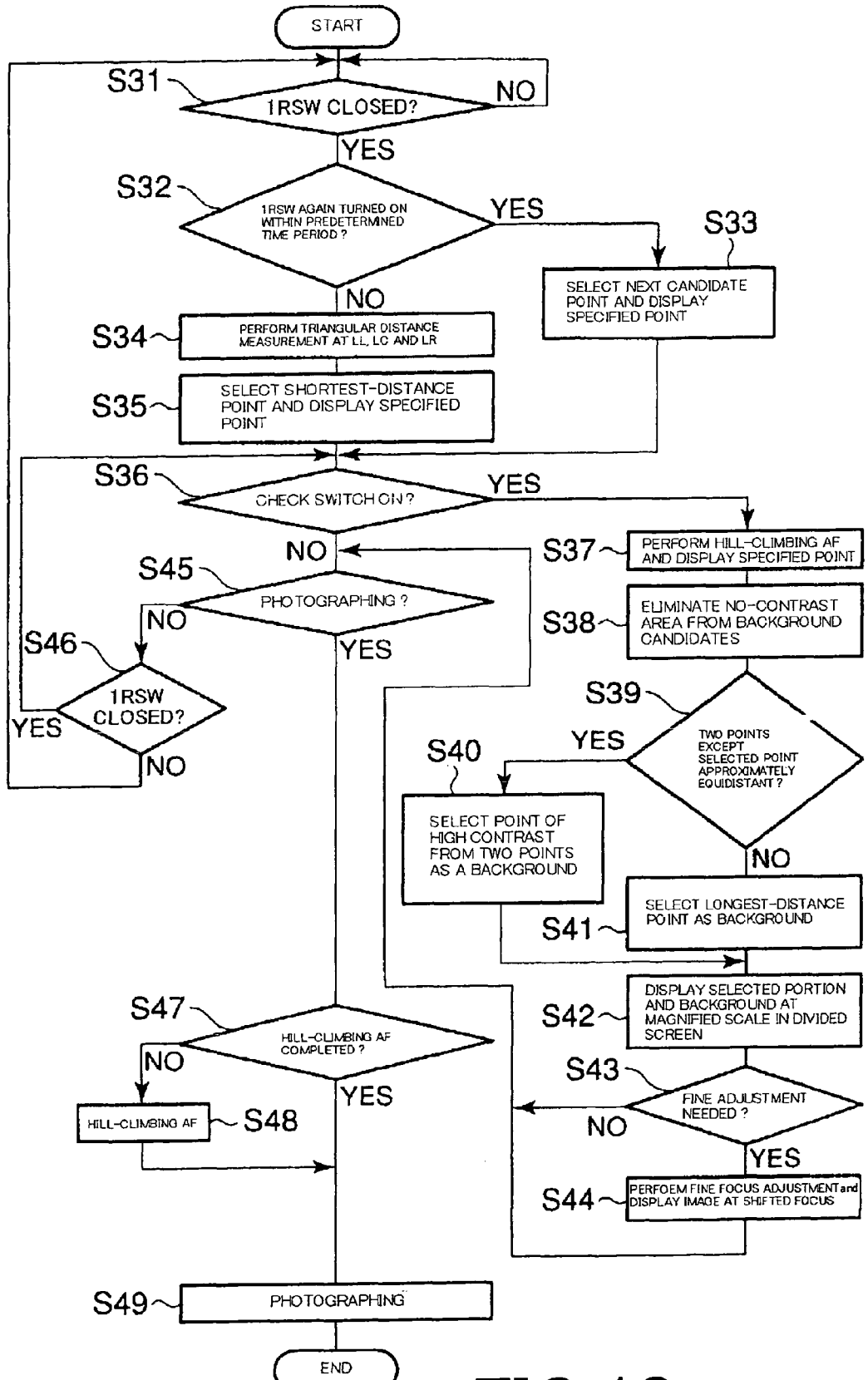
FIG. 10 is a flowchart of an exemplary photographing operation of the camera according to the second example.

The photographing operation of the camera according to the second example will be described below with reference to the flowchart shown in FIG. 10.

First, in Step S31, when the first release switch (1RSW) is closed, the CPU 1 starts control. This camera is constructed so that distance measuring points can be switched when the first release switch (1RSW) is again closed. For this reason, in Step S32, the state of the first release switch (1RSW) is again detected within a predetermined time period. If a closed state of the first release switch (1RSW) is detected, the process proceeds to Step S33, in which the CPU 1 gives an instruction to select another distance measuring point in the picture and an instruction to display a newly selected distance measuring point, and the new distance measuring point is displayed on the monitor screen.

On the other hand, if it is not detected in Step S32 that the first release switch (1RSW) has been closed again within the predetermined time period, the process proceeds to Step S34. In Step S34, as described above, the triangular distance measuring sensing device is used to measure the distance to the subject 21 at three points (45L, 45C and 45R shown in FIG. 7) in the picture, and the measured results are detected as LL, LC and LR.

As described above, in the second example, when it is detected that the first release switch (1RSW) has been closed again within the predetermined time period, the process transfers to an operation mode which allows the user to select a distance measuring point.

Then, in Step S35, the shortest distance from the camera is selected from among the measured results obtained in Step S34. This selected distance is defined as a main subject distance, and a subject lying at a distance measuring point corresponding to this main subject distance is defined as a main subject. This is because a subject present at the shortest distance from the camera is generally a main subject. However, the main subject need not necessarily be selected by this method. Another method, for example, contour detection or edge detection using image signals, can be adopted as a method for selecting a main subject; in the second example, using the shortest distance selecting method is referred to for simplicity in explanation.

A user can confirm whether the distance measuring point, i.e., the main subject selected in this manner, is appropriate by viewing the monitor screen shown in FIG. 3B or 3C.

Then, in Step S36, the state of the check switch 15 is detected in order to confirm the state of focusing. If the check switch 15 is manipulated, i.e., closed, the process proceeds to Step S37, whereas if the check switch 15 is open, the process proceeds to Step S45.

In Step S37, hill-climbing auto-focusing (AF) is performed on the selected distance measuring point, and an image is picked up in the obtained focused state.

Then, a process for making a background decision using Steps S38 to S41 is performed.

First, in Step S38, an area having almost no contrast in the picture is eliminated from background candidates. Then, in Step S39, a decision is made as to the distances corresponding to two distance measuring points other than the distance measuring point selected in Step S35, from among the three measured distances obtained by performing the triangle distance measurement in Step S34. Specifically, if the measured distances corresponding to the other two distance measuring points are approximately equal to each other, the process proceeds to Step S40, while if those measured distances differ from each other, the process proceeds to Step S41.

In Step S40, since the other two distance measuring points lie at approximately equal distances from the camera, subjects lying at both points are compared and a subject of higher contrast is selected as background. In contrast, in Step S41, a subject lying at a distance measuring point farther from the camera of the other two distance measuring points is selected as background.

Then, in Step S42, the selected main subject portion and background portion are magnified, and are displayed (e.g., side by side) in separate areas of the monitor screen. Images displayed in this manner are, for example, shown in FIG. 3E. The user may manipulate the check switch 15 for fine adjustment of focus, while viewing the monitor screen on which these images are displayed.

In Step S43, it is determined whether fine adjustment of focus is needed, on the basis of the manipulation of the check switch 15. If the manipulation of the check switch 15 is detected and it is determined that fine adjustment of focus is needed, the process proceeds to Step S44. In Step S44, fine adjustment of the focus of the photographing lens 2 is performed according to the manipulation of the check switch 15, and an image is picked up and displayed in a finely adjusted focused state.

After the process of Step S44, or if it is determined in Step S43 that fine adjustment of focus is not needed, the process proceeds to Step S45.

In Step S45, it is detected whether the second release switch (2RSW) has been closed, and it is determined whether photography is to be performed. If the second release switch (2RSW) is closed and photography is to be performed, the process proceeds to Step S47, whereas if photography is not to be performed, the process proceeds to Step S46.

In Step S46, the state of the first release switch (1RSW) is again detected. If the first release switch (1RSW) is closed, the process proceeds to Step S36, whereas if the first release switch (1RSW) is open, the process proceeds to Step S31.

In Step S47, it is determined whether a focusing process using a hill-climbing auto-focusing method has been performed. For example, if the process proceeds from Step S36 directly to Step S47 through Step S45, it may be determined in Step S47 that hill-climbing auto-focusing operation has not yet been performed, and the process proceeds to Step S48, in which a hill-climbing auto-focusing process is performed.

Finally, an image is picked up in Step S49, and this sequence is completed.

Since the CPU 1 performs control in the above-described manner, the user can finely adjust focus to a desired state while comparing the background and the main subject. In addition, since the displayed image is magnified, the chance that the user fails to focus the image as they desire is extremely low.

The second example has been explained with reference to displaying a main subject and a background side by side. However, as shown in FIG. 3D, it is possible to only display an image of a main subject at a magnified scale in Step S42.

As described above, according to the second example, distance measuring points can be selectively displayed at high speed because triangular distance measurement does not need lens movement. Accordingly, a subject can be selected at high speed, whereby more rapid photography can be performed.

In addition, after hill-climbing auto-focusing has been performed, the user can confirm whether, for example, a person displayed in either one of two pictures can be clearly seen compared to a background displayed in the other. Accordingly, the user can enjoy a higher-level of control over their photography.

Figure 11:
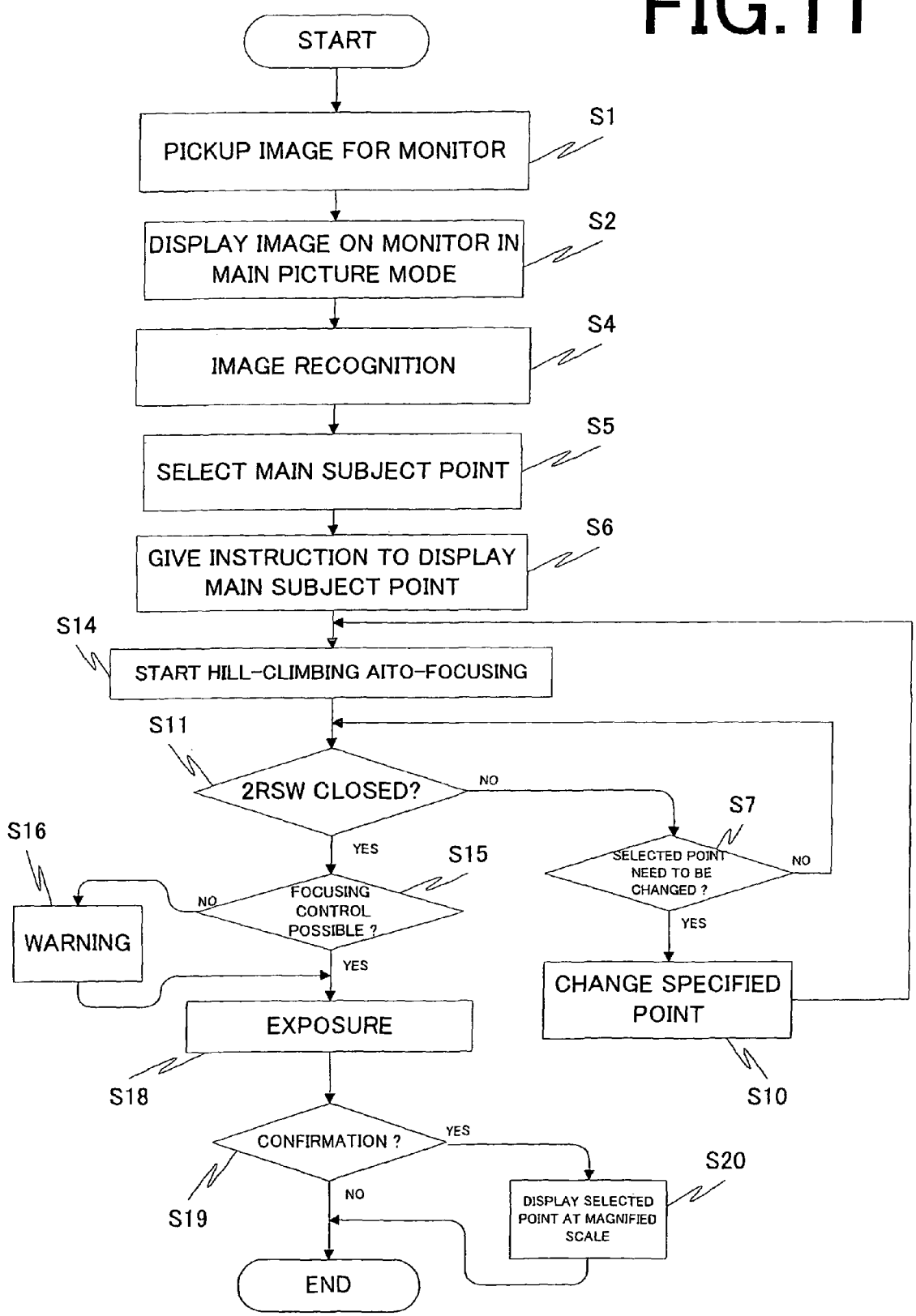
FIG. 11 is a flowchart showing a modified exemplary photographing operation of the camera according to the first example.

FIG. 11 is a flowchart showing an exemplary modification of the photographing operation controlled by the CPU 1 in the camera according to the first example. In the flowchart of FIG. 11, the same step numbers are used to denote steps having the same functions as those shown in FIG. 4, and the detailed description thereof is omitted.

In Step S1, an image pickup process for displaying a monitor image in the viewfinder or on the LCD or the like is performed. In Step S2, the result of the image pickup process is displayed on the monitor (on the LCD or in the viewfinder). In Step S4, an image signal obtained in the image pickup process is used to perform recognition of the colors and/or the pattern (image) of a subject in each of areas 3R, 3C and 3L. As the result of the recognition, a subject suitable for a main subject is selected in Step S5. In the following Step S6, an instruction to the display section so that a selection mark is displayed on the monitor in association with the selected subject.

A hill-climbing auto-focusing operation for the subject lying at the selected distance measuring point is started in Step S14.

Then, in Step S11, it is determined whether the second release switch (2RSW) has been closed. If the second release switch (2RSW) has been closed, it is determined in Step S15 whether focusing control is possible. If focusing is possible at the selected distance measuring point, the process proceeds to the exposure control of Step S18. Then, in Step S19, it is determined whether the check switch 15 has been manipulated. If the check switch 15 has been manipulated by the user, the process proceeds to Step S20, in which a subject lying at the distance measuring point selected for focusing is displayed at a magnified scale.

On the other hand, if it is determined in Step S15 whether focusing control is impossible, the process proceeds to Step S16 and a warning is issued. After that, exposure and magnified displaying are performed as described above.

If the second release switch (2RSW) has not been closed in Step S11, the process proceeds to Step S7, in which it is determined whether the distance measuring point needs to be changed. If the distance measuring point needs to be changed, the process proceeds to Step S10, in which the change of the distance measuring point and displaying the same are performed. After that, the process returns to Step 14 and a hill-climbing auto-focusing operation for a new distance measuring point is started.

If the distance measuring point does not need to be changed, the process returns to Step S11, in which it is determined whether the second release switch (2RSW) has been closed.

In this control sequence, immediately after a subject has been selected as the main subject in Step S5, a hill-climbing auto-focusing operation for the selected subject is started, and after that, decisions are made as to the state of the second release switch (2RSW) and as to the necessity for changing the distance measuring point. Accordingly, as compared with the examples shown in FIGS. 4 and 10, the period of time from the start of photography until the end thereof is expected to decrease.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A focusing method of a picture taking apparatus using a picked up image for focusing of a photographing lens, the focusing method comprising:
    detecting, automatically, a pattern of a person from an image signal of a subject in response to a partway depressing operation of a release button, and selecting, automatically, the detected pattern as a main subject;
    displaying an indicator indicative of a position of the main subject on a monitor by superimposing the indicator on the image signal;
    allowing a user to change the position of the indicator during the partway depressing operation of a release button, and changing the position of the indicator to another position when the user provides a change of indicator position input; and
    performing a focusing operation so that the contrast of the subject image area corresponding to the indicator becomes the maximum in case the release button is fully depressed.

2. The focusing method according to claim 1, wherein a warning is displayed if the change of indicator position input, provided by the user, positions the indicator at a position at which focusing control is impossible.

3. The focusing method according to claim 1, wherein the subject image area corresponding to the indicator is displayed at a magnified scale after the focusing.

4. A picture taking apparatus using a picked up image for focusing of a photographing lens, the picture taking apparatus comprising:
    the photographing lens;
    an image pickup unit which acquires an image signal of a subject through the photographing lens;
    a selection unit which detects, automatically, a pattern of a person, from a plurality of areas of the image signal corresponding to a plurality of points in a picture, in response to a partway depressing operation of a release button and sets, automatically, the area having the detected pattern of the person as a main subject area;
    a display unit which displays an indicator indicative of the area selected by the selection unit, by superimposing the indicator on the image signal;
    a change instruction unit which allows a user to change the position of the indicator during the partway depressing operation of a release button, and changing the position of the indicator to another position when the user provides a change of indicator position input; and
    a control unit which focuses the photographing lens so that the contrast of the area selected by the selection unit or instructed by the change instruction unit becomes the maximum.

* * * * *